Sept. 21, 1965   L. J. NASON ETAL   3,206,872
TEACHING AID
Filed Jan. 28, 1963

INVENTORS
P. DIANE BAILEY
LESLIE J. NASON
BY 
ATTORNEY

United States Patent Office 3,206,872
Patented Sept. 21, 1965

3,206,872
TEACHING AID
Leslie J. Nason, 216 Euclid Ave., Long Beach 3, Calif., and P. Diane Bailey, 4111 Berryman Ave., Los Angeles 66, Calif.
Filed Jan. 28, 1963, Ser. No. 254,225
3 Claims. (Cl. 35—31)

This invention relates to a teaching aid whereby a student may be self taught, or where he may be instructed by a teacher.

An object of our invention is to provide a teaching aid consisting of a pack of cards having indicia thereon, with a resilient band encircling the cards to hold them in a pack.

Another object of our invention is to provide a novel teaching aid in which the cards may be manipulated either by the student or by the teacher, and where the various cards will teach mathematics, languages, and other fields of learning.

Still another object of our invention is to provide a novel teaching aid in which the resilient band encircling the pack is formed with an opening or window therein through which a sign on the cards is observed to indicate forms of arithmetic, such as addition, subtraction, division, and multiplication.

Still another object of our invention is to provide a novel teaching aid, in which the resilient band encircling the pack of cards covers one figure or numeral in a three figure or numeral series, the covered figure, numeral or letter consisting of the answer required of the student.

Still another object of our invention is to provide a teaching aid which has great flexibility, and which can be readily adapted to the abilities of the student and either increased or decreased in speed as might be required.

Other objects, advantages and features of invention may appear from the accompanying drawing, the subjoined detailed description and the appended claims.

Figure 2:
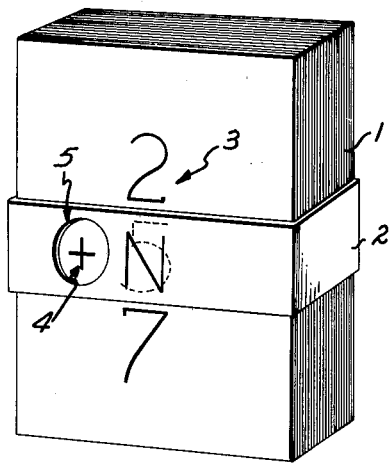
FIGURE 2 is a front elevation of a pack of cards showing one card pulled out to reveal an answer.

Referring more particularly to the drawing, the numeral 1 indicates a pack of cards which may be cut from paper sheets, plastic, or the like, and which are held in a compact group or pack by means of a continuous band 2, which may be made of rubber or resilient plastic and which completely encircle the pack 1 to hold the various cards in that pack in proper position.

Figure 1:
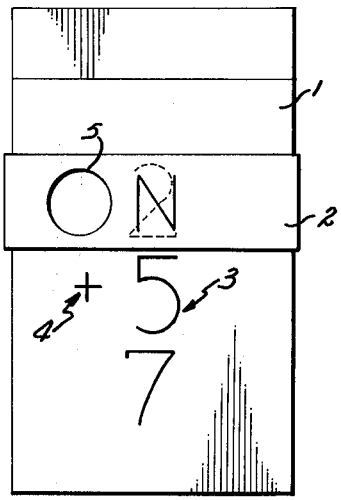
FIGURE 1 is a perspective view of a pack of cards comprising our teaching aid.
Figure 1:
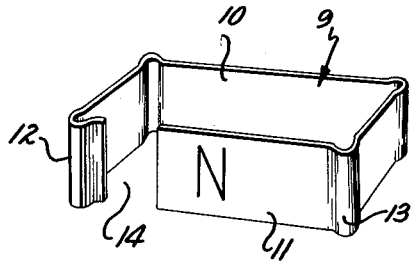

Assuming problems in addition are being taught; the cards in the pack 1 will have three indicia thereon indicated at 3, and as here shown three numerals are placed in vertical alignment, namely, the numerals 2, 5 and 7. Also to one side of the central numeral or figure a mathematical sign 4 is placed, in this case a plus sign. The sign 4 is observable through an opening, window or hole 5 in the band 2. When the cards are in the position shown in FIGURE 1 the numerals 2 and 7 are exposed, as is the plus sign 4. The student will mentally ask the question, "2 added to what number equals 7?" The answer of course is 5, which initially is hidden under the band 2. When the student answers, the answer can be checked by simply pulling the card downwardly to the position shown in FIGURE 2, which reveals the answer. The next card will have a different problem and so on, until the entire pack has been used.

Figure 5:
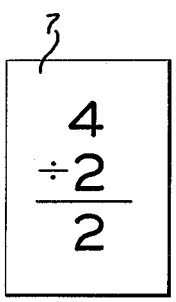
FIGURE 5 is a front elevation of a card showing a subtraction problem.
Figure 6:
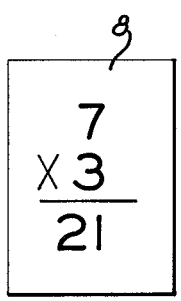
FIGURE 6 is a front elevation of a card showing a division problem.
Figure 7:
FIGURE 7 is a front elevation of a card showing a multiplication problem.

In FIGURE 5 a card 6 is shown in which a problem in subtraction is shown. Again the central numeral is the answer, and also on that same plane the mathematical sign indicating addition, subtraction, etc. In FIGURE 6 we have shown a card 7 in which a problem in division is shown. In FIGURE 7 we have shown a card 8 in which a problem in multiplication is shown. In each instance this is the answer. Also the window or opening instance the band 2 covers one of the numeral sequence, and in each instance this is the answer. Also the window or opening in the band 2 exposes the mathematical sign which governs the problem.

Figure 3:
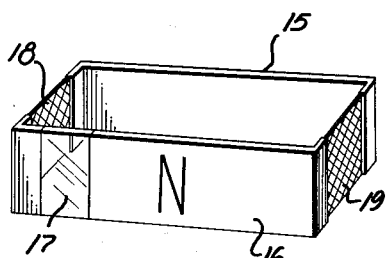
FIGURE 3 is a perspective view of a modified form of yieldable band.

In FIGURE 3 we have shown a modified form of the band 9, in which a means is provided to spring the side members 10 and 11 inwardly against the card pack 1. This spring pressure or elasticity is provided by outwardly curved edges 12 and 13, which provide resiliency for the side members and cause these members to be yieldably pressed inwardly.

Figure 4:
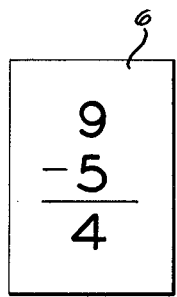
FIGURE 4 is a perspective view of still another type of band.

In FIGURE 4 we have shown a band 15 which is similar in construction to the band 9, except that the opening in the front wall 16 consists of a transparent window 17 which is mounted in this front wall and is an integral part thereof. This transparent window also permits the pupil to observe the mathematical sign which governs the particular problem. Also the side members are formed of substantially rigid material and are elastically pressed towards each other and against the pack 1 by means of elastic bands 18 and 19. These elastic bands are suitably attached to the side walls as shown, and serve to compress the card pack.

Having described my invention, I claim:

1. A teaching aid comprising a pack of separate cards, a plurality of symbols on each of said cards, a band encircling the pack of cards and elastically gripping the cards, said band having a lesser width dimension than the length dimension of the cards, said band covering at least one of said symbols on the top card of the pack, said band having an opening therein to expose a sign on the uppermost of said cards.

2. A teaching aid comprising a pack of separate cards, a plurality of symbols on each of said cards, a band encircling the pack of cards and elastically gripping the cards, said band having a lesser width dimension than the length dimension of the cards, said band covering at least one of said symbols on the top card of the pack, said band having an opening therein to expose a sign on the uppermost of said cards, said opening consisting of a hole through one wall of said band.

3. A teaching aid comprising a pack of separate cards, a plurality of symbols on each of said cards, a band encircling the pack of cards and elastically gripping the cards, said band having a lesser width dimension than the length dimension of the cards, said band covering at least one of said symbols on the top card of the pack, said band having an opening therein to expose a sign on the uppermost of said cards, said opening consisting of a transparent window in one wall of said band.

References Cited by the Examiner

UNITED STATES PATENTS

| 381,425 | 4/88 | Rosenwasser et al. | 116—135 X |
| 1,641,982 | 9/27 | McDade | 35—9.1 |
| 2,769,640 | 11/56 | Elder | 35—30 |

EUGENE R. CAPOZIO, *Primary Examiner.*

LAWRENCE CHARLES, JEROME SCHNALL,
*Examiners.*